United States Patent Office 2,995,461
Patented Aug. 8, 1961

2,995,461
PROTECTIVE COATINGS
James L. Boicey and Charles M. Browne, Toledo, Ohio, assignors to Libbey-Owens-Ford Glass Company, Toledo, Ohio, a corporation of Ohio
No Drawing. Filed Apr. 2, 1956, Ser. No. 575,328
11 Claims. (Cl. 117—5.5)

The present invention relates broadly to the production of transparent, electrically conducting films, and more particularly to a novel technique, involving the application of masking materials prior to filming, that will prevent the formation of film on selected surface areas.

Now transparent, electrically conducting coatings of compounds such as tin oxide, for example, on vitreous surfaces are well known, as shown in the patent to Harold A. McMaster, No. 2,429,420, issued October 21, 1947.

Generally stated, such films are produced by first heating the vitreous surface to be filmed to substantially its point of softening and then subjecting the heated surface to the chemical action of an appropriate metal compound in fluid form until a film of the desired thickness, conductivity, and transparency has formed.

Perhaps the greatest present day use for such films is in connection with the de-icing or de-fogging of windows and windshields of aircraft and other automotive vehicles, and in filming glass sheets for this purpose it is customary to spray the heated surface of the glass with a solution of a tin compound, although other compounds have also been used and disclosed in issued patents.

However, during such spraying, unless precautions are taken, the film will not only form on the surface which it is desired to film but also on the sheet edges and the opposite surface thereof. One of the principal objections to this is that the unwanted film gives the effect of two resistances in parallel and makes it impossible to accurately measure top surface resistances without first grinding the film from the glass edges.

Furthermore, because of present day automotive and aircraft styling, it is often necessary to place the electrically conducting coatings on variously shaped windows having non-rectangular contours. As a result, it is sometimes necessary that the electrodes and the electrically conducting film be confined to certain areas of the glass sheets and in certain orientation with respect to one another so that the proper current pattern and uniformity of heating can be obtained over the electrically conducting film.

To properly locate the electrically conducting film on a given shape of glass sheet, it has heretofore been found commercially desirable in most cases to first coat the entire window or lite with the conducting film and then to remove portions of the film along selected areas so that a film shape calculated to give the proper current path will be obtained.

A number of different ways have been suggested for accomplishing this purpose, but to date none of them has proved to be completely satisfactory. For example, one commercial way of removing or deleting unwanted portions of the film after it has been formed is by treatment with zinc and hydrochloric acid. Although this is a workable procedure, it is also a costly, troublesome and time consuming one, involving the necessity of carefully masking the areas of the film to be retained, and the usual problems encountered with any kind of an acid treatment.

According to the present invention, on the other hand, similar results are obtained by merely coating the portions of the glass that it is not desired to have filmed with a special masking compound, prior to heating the glass preparatory to filming. The coating, as applied, forms a tightly adherent paint-like covering, but when the glass is heated the film of the invention is fired into an adherent, powdery masking coat which prevents the formation of film on the masked areas when the glass sheet is sprayed with the film forming material, but which is readily removed upon washing of the glass after filming; and which does not stain, mark, or in any other way adversely affect the glass surface in the unfilmed areas.

A simplified flow diagram of this procedure is as follows:

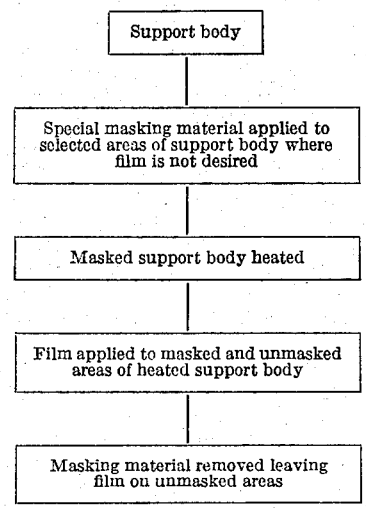

It is accordingly a primary object of this invention to provide a novel technique for preventing the formation of electrically conducting film on unwanted areas of a filmed base that is simpler, faster and more economical than the procedures heretofore available.

Another object is the provision, in a method of producing electrically conducting films on selected areas only of a vitreous base, of a protective coating material that can be rolled, painted, sprayed, marked, or otherwise readily applied to such base; and that will successfully prevent the formation of film on the protected areas when the base is heated to substantially its point of softening and subjected to the chemical action of metal compounds at such temperatures.

Another object is the provision in such a method of a coating material of this character that will dry quickly into an impervious coating that will not crack off the glass in handling or when contacted by tongs or other sharp objects.

Another object is the provision in such a method of a powder-like coating that adheres strongly to the glass and will not be blown off by high pressure air and/or liquid from spray guns and cooling jets used in the filming process.

Still another object is the provision in such a method of a coating of the above character that can be readily removed from the glass by the normal washing treatment without marring or adversely affecting the glass surface in any way.

Other objects and advantages of the invention will become more apparent during the course of the following description.

As indicated above, in practicing the present invention a glass sheet, for example, of the desired shape and size, is first selected and a determination made as to the areas which should be filmed and the areas or lines on which it is desired to have no film. The areas on which the film is not wanted are then covered with the special masking material of the invention by spraying, rolling, or painting, depending on which procedure is best adapted to the size and shape of the areas to be covered. In the case of line areas it has been found desirable to incorporate the masking material into a crayon-like form, with a more or less pointed end, which can be drawn over the glass surface to produce a masking coat along the line which is to be left unfilmed.

The partially masked glass sheet is next placed in a suitable furnace and heated to the temperature necessary for filming. In the case of electrically conducting films this is usually to a temperature which approximates the softening point of the glass, but for other types of films the glass may be heated to a lesser extent or not at all.

Upon removal from the furnace, the heated glass sheet is sprayed or otherwise subjected to the action of a film forming material in fluid form for a sufficient length of time to permit the filming material to react with the hot glass and form a film of the desired thickness and characteristics. After filming the glass may be rapidly chilled as by blasts or jets of air if desired.

During the heating portion of the filming procedure the masking material will be dried into an impervious tightly, adherent coating that is usually powdery but that will successfully prevent the formation of any film on the coated areas of the glass. Nevertheless, after the filming operation is completed the masking coating can be readily removed by the normal washing and/or scrubbing to which the filmed sheet is subjected as part of the regular procedure.

The special masking material of the invention comprises essentially a suspension of a salt that will leave a post-firing residue on the glass that is impervious to the action of the filming material, that will not fuse to or mar the glass, and that is readily removable by normal washing procedures. Very excellent results are obtained with the solid, thermally stable, inorganic compounds which are inert to glass at high temperatures.

A number of salts including the sulphates and chlorides are sufficiently stable, solid and inert to glass at the filming temperatures to be satisfactory. We have discovered that generally speaking the anhydrous sulphates and chlorides of the following materials are most suitable for our purpose:

Sodium              Calcium
Potassium           Strontium
Magnesium           Barium
Titanium Of these, sodium sulphate, potassium sulphate, and magnesium sulphate are preferable because they are all completely soluble in water, and therefore the post-firing residue resulting from the use of a suspension or mixture of any one of these can be removed from the glass by simply rinsing in water. To date, sodium sulphate has given the best all around results of any of the salts tried, and is the material that we prefer to use in practicing our invention. However, the salts which may be brushed off or removed with solvents and the like and which do not affect the filmed surface are also suitable.

Whatever the salt, it is preferably finely milled and for the purpose of spraying, rolling, or painting it on the glass, should be suspended in an anhydrous vehicle. This may be normal butyl acetate. However, practically any organic anhydrous liquid having a low boiling point and high vapor pressure that will not react with the salt or adversely affect the glass and that is miscible with the binder employed can be used. For example, anhydrous ketones like acetone, esters such as ethyl acetal, and chlorinated aliphatic compounds like ethylene dichloride, can all be used.

A suitable binding agent should be employed to hold the particles of the finely milled salt together and to cause them to initially adhere to the glass. Thickening and leveling agents may also be included in the suspension.

In preparing a solution of masking material, it is necessary to make adjustments in the drying time and the viscosity of the solution to accommodate the particular type of application contemplated such as rolling, brushing, or spraying. It is therefore impractical to set forth definite proportions of the ingredients in the suspension because they may be rather widely varied depending on the conditions to be met. However, for the purpose of example only, a typical solution for rolling or brushing that has been found to be very satisfactory is made up of:

125 cc. of 10% 5–6 sec. nitrocellulose in normal butyl acetate
125 cc. in normal butyl acetate
125 cc. of Solvesso 150
10 grams of Santocel CX
100 grams of sodium sulphate In this solution the sulphate is formed of a finely milled sodium sulphate. The binder used in the solution is nitrocellulose in a butyl acetate solvent or, may be cellulose acetate, formvar or other lacquer type materials. The thickening and leveling agent is Santocel CX made by the Monsanto Chemical Co. which includes finely divided silica. The addition of Santocel improves the working properties of the solution and prevents coalescence of the sodium sulphate particles during drying. The Solvesso of the solution is made by Standard Oil Co. of Ohio and is used for the purpose of controlling the drying rate, however other lacquer solvents of low volatility may be used. The solutions of the masking material thus formed generally harden and therefore can be touched without smearing thus enabling very accurate and true demarcation lines to be obtained along the area where it is desired to prevent the electrically conductive film from forming.

If the suspension is to be used for spraying instead of rolling or brushing, the thickening agent is generally left out to lower the viscosity of the mixture.

When it is desired to use a crayon to apply the masking material, the salt is combined with carriers such as organic waxes that can be readily molded into crayon form which will produce a heavy legible mark on the glass and will burn off to leave a relatively loose or water soluble residue on the glass after firing but will not result in marking or staining of the glass.

Now, in utilizing the masking composition of the invention, the material, in either the crayon or liquid form, is placed on the glass according to the pattern or configuration upon which it is desired to prevent the film from forming. The glass is then heated and during heating the solvents and binders originally mixed with the sulphates or chlorides will burn off or evaporate leaving a residue. The film spray material which is directed toward the sheet is thus prevented from coming in contact with the glass at the coated areas. After the electrically conductive filming process has been completed, the post-firing residue may be easily removed by dissolving, washing or rinsing.

While the invention has been discussed in connection with electrically conducting films it will be evident that it is also applicable to other types of films. In this connection, if the glass is not heated in forming the film, the material does not become powdery or water soluble and must be dissolved or brushed off.

Furthermore, it is of course to be understood that the forms of the invention herewith described are to be taken as illustrative embodiments only, and that various procedural and compositional changes may be resorted to without departing from the spirit of the invention or the scope of the subjoined claims.

We claim:

1. In a method of forming a film on selected areas only of a support body, the steps of placing on the support body over the areas where it is desired to prevent the formation of the film a suspension, in a lacquer-like vehicle comprising a mixture of an organic anhydrous liquid and a miscible binder, of a finely milled inorganic thermally stable water soluble masking material that is inert to said support body under heat, which suspension forms a post-firing residue impervious to the filming material but readily removed by water washing.

2. The method of forming a film on a support body as claimed in claim 1, wherein the inorganic masking material contains a sulphate compound.

3. The method of forming a film on a support body as claimed in claim 1, wherein the inorganic masking material contains a chloride compound.

4. The method of forming a film on a support body as claimed in claim 1, wherein the masking material includes sodium sulphate.

5. The method of forming a film on a support body as claimed in claim 1, wherein the masking material includes potassium sulphate.

6. The method of forming a film on a support body as claimed in claim 1, wherein the masking material includes magnesium sulphate.

7. The method of forming a film on a support body as claimed in claim 1, wherein the masking material includes calcium sulphate.

8. The method of forming a film on a support body as claimed in claim 1, wherein the support body is glass the film to be formed is an electrically conducting film and the support body is heated to around the point of softening before filming.

9. The method of forming a film on a support body as claimed in claim 1, wherein the masking material is placed on said support body by means of a crayon in which it is incorporated.

10. The method of preventing the formation of film on selected areas of a surface of a support body during filming which comprises coating said selected areas with a material comprising the following ingredients in approximately the proportions given: 12.5 parts of 10% nitrocellulose in normal butyl acetate, 12.5 parts normal butyl acetate and 10 parts of finely milled sodium sulfate, heating the support, directing film forming material over the surface of said sheet on which selected areas have been coated, and then removing said coating material.

11. The method of preventing the formation of film on selected areas of a surface during filming which comprises masking said selected areas with a coating comprising the following ingredients in approximately the proportions given: 12.5 parts of 10% nitrocellulose in normal butyl acetate, 12.5 parts normal butyl acetate and 10 parts of a finely milled inorganic thermally stable water soluble material that is inert to said support body at high temperatures; heating said masked surface; directing a filming material over the masked and unmasked areas, and then removing said masking material.

References Cited in the file of this patent

UNITED STATES PATENTS

| | | |
|---|---|---|
| 2,016,381 | McBurney | Oct. 8, 1935 |
| 2,152,536 | Cooper | Mar. 28, 1939 |
| 2,335,760 | Hucks | Nov. 31, 1943 |
| 2,386,626 | Nadeau et al. | Oct. 9, 1945 |
| 2,559,969 | Kennedy | July 10, 1951 |
| 2,617,741 | Lytle | Nov. 11, 1952 |
| 2,673,387 | Forker | Mar. 30, 1954 |
| 2,790,736 | McLaughlin et al. | Apr. 30, 1957 |
| 2,930,106 | Wrotnowski | Mar. 29, 1960 |